United States Patent
Cui et al.

(10) Patent No.: US 12,359,863 B2
(45) Date of Patent: Jul. 15, 2025

(54) CONTROL METHOD FOR REFRIGERATOR, AND COMPUTER STORAGE MEDIUM

(71) Applicants: SHENYANG HAIER REFRIGERATOR CO., LTD., Liaoning (CN); QINGDAO HAIER REFRIGERATOR CO., LTD., Shandong (CN); HAIER SMART HOME CO., LTD., Shandong (CN)

(72) Inventors: Zhanpeng Cui, Shandong (CN); Jiaming Li, Shandong (CN); Lisheng Ji, Shandong (CN); Peng Lyu, Shandong (CN)

(73) Assignees: SHENYANG HAIER REFRIGERATOR CO., LTD., Liaoning (CN); QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 328 days.

(21) Appl. No.: 18/025,451

(22) PCT Filed: Aug. 31, 2021

(86) PCT No.: PCT/CN2021/115638
§ 371 (c)(1),
(2) Date: Mar. 9, 2023

(87) PCT Pub. No.: WO2022/057615
PCT Pub. Date: Mar. 24, 2022

(65) Prior Publication Data
US 2023/0324102 A1    Oct. 12, 2023

(30) Foreign Application Priority Data
Sep. 15, 2020  (CN) .......................... 202010968847.4

(51) Int. Cl.
*F25D 21/14*    (2006.01)
*F25D 17/04*    (2006.01)
*F25D 17/06*    (2006.01)

(52) U.S. Cl.
CPC ......... *F25D 17/062* (2013.01); *F25D 17/045* (2013.01); *F25D 21/14* (2013.01)

(58) Field of Classification Search
CPC ...... F25D 17/045; F25D 17/062; F25D 21/04; F25D 21/14; F25D 23/025;
(Continued)

(56) References Cited

U.S. PATENT DOCUMENTS 10,473,378 B2 * 11/2019 Lee ........................ F25D 23/028
11,788,785 B2 * 10/2023 Kim ....................... F25D 23/021
                                                          312/405.1
(Continued)

FOREIGN PATENT DOCUMENTS

| CN | 104457102 A | 3/2015 |
| CN | 105444489 A | 3/2016 |

(Continued)

OTHER PUBLICATIONS

Chinese Intellectual Property Office (ISR/CN), "International Search Report for PCT/CN2021/115638", China, Nov. 12, 2021.

*Primary Examiner* — Filip Zec
(74) *Attorney, Agent, or Firm* — troutman pepper locke; Tim Tingkang Xia, Esq.

(57) ABSTRACT

A control method for a refrigerator and a computer storage medium are provided. The refrigerator comprises a refrigerator body defining a first chamber and a door body that comprises a main door defining a second chamber, and a secondary door; a rear wall of the main door is provided with an air supply port formed thereon and a condensation removal air channel defined therein; a plurality of conden- (Continued)

sation removal holes are formed on the front surface of the rear wall. The control method comprises: acquiring an air relative humidity $\varphi$ of the second chamber; acquiring an air relative humidity threshold $\varphi_0$; comparing $\varphi$ with $\varphi_0$; if $\varphi \leq \varphi_0$, closing the condensation removal air channel, and opening the air supply port; and if $\varphi > \varphi_0$, closing the air supply port, and opening the condensation removal air channel to operate a condensation removal mode.

10 Claims, 8 Drawing Sheets

(58) Field of Classification Search
CPC .... F25D 2317/0411; F25D 2317/04111; F25D 2317/062; F25D 2321/14; F25D 2323/023; F25D 2700/02; F25D 2700/121; F25D 11/02; F25D 21/06; F25D 23/02; F25D 29/003
See application file for complete search history.

(56) References Cited

U.S. PATENT DOCUMENTS

| | | | |
|---|---|---|---|
| 12,007,156 B2* | 6/2024 | Shivappa Thenehalli | ............ F25D 23/087 |
| 2014/0165643 A1* | 6/2014 | Boarman | ............ F25B 21/02 62/340 |
| 2018/0328641 A1* | 11/2018 | Lee | ............ F25D 23/04 |

FOREIGN PATENT DOCUMENTS

| | | |
|---|---|---|
| CN | 108050745 A | 5/2018 |
| CN | 108917271 A | 11/2018 |
| CN | 110513957 A | 11/2019 |
| KR | 20160045316 A | 4/2016 |

* cited by examiner

CONTROL METHOD FOR REFRIGERATOR, AND COMPUTER STORAGE MEDIUM

CROSS-REFERENCE TO RELATED PATENT APPLICATION

This application is a U.S. national stage application of PCT Patent Application No. PCT/CN2021/115638 filed Aug. 31, 2021, which claims priority to and the benefit of Chinese Application No. 202010968847.4 filed Sep. 15, 2020, which are incorporated herein in their entireties by reference.

FIELD OF THE INVENTION

The present invention relates to the technical field of refrigeration and freezing, and in particular to a control method for a refrigerator, and a computer storage medium.

BACKGROUND OF THE INVENTION

With the development of technologies and the improvement of people's living standards, users have higher and higher requirements on refrigerators. A conventional refrigerator provided with only a refrigeration chamber, a freezing chamber and a variable-temperature chamber can no longer meet the diversified needs of users on storage spaces.

In recent years, a composite door technology has emerged in the field of refrigerators. It is known to all that a conventional refrigerator door body is used to open or close a refrigerating chamber of a refrigerator body, and at most a bottle holder for placing bottled products is disposed at a lining of the refrigeration door body. However, a refrigerator with a composite door body is improved in structure and function of the door body, where the door body includes a main door and a secondary door, and the main door is used to open or close the refrigerating chamber. In addition, the main door defines a door chamber with an open front side, and the secondary door is used to open or close the door chamber. During rotation of the main door, the secondary door is kept closed. The door chamber may be used to place to-be-stored objects, and a user just needs to open the secondary door to take or put objects without opening the main door. This achieves more convenient and more efficient operation, and also avoids excessive loss of cold energy caused by frequent opening of the main door.

However, in an operating process of a composite door type refrigerator, frequent occurrence of condensation on the inner wall of the door chamber affects user experience and hinders further development of the composite door technology. Therefore, how to reduce or avoid condensation on the inner wall of the door chamber has become a technical problem to be solved urgently in the art.

BRIEF DESCRIPTION OF THE INVENTION

A purpose of the present invention is to provide a refrigerator capable of effectively removing condensation on an inner wall of a door chamber to at least overcome one of the above shortcomings existing in the prior art.

A further purpose of the present invention is to effectively predict a condensation state so as to remove condensation in time.

In one aspect, the present invention provides a control method for a refrigerator. The refrigerator includes a refrigerator body and a door body, where a front side of the refrigerator body is open to define a first chamber; the door body includes a main door configured to open or close the first chamber and defining a second chamber, and a secondary door configured to open or close the second chamber; a rear wall of the main door is provided with an air supply port configured to supply cold air in the first chamber into the second chamber; the rear wall is in a hollow shape, in which a condensation removal air duct in communication with the first chamber is defined; a plurality of condensation removal holes in communication with the second chamber and the condensation removal air duct are formed backwards on a front surface of the rear wall; and the control method includes:

acquiring a relative air humidity $\varphi$ of the second chamber;

acquiring a relative air humidity threshold $\varphi_0$ at which air in the second chamber begins to condense on the front surface of the rear wall;

comparing the relative air humidity $\varphi$ with the relative air humidity threshold $\varphi_0$;

if $\varphi \leq \varphi_0$, closing the condensation removal air duct, and opening the air supply port to run a cooling mode in which the air in the first chamber enters the second chamber via the air supply port; and if $\varphi > \varphi_0$, closing the air supply port, and opening the condensation removal air duct to run a condensation removal mode in which the air in the first chamber enters the condensation removal air duct and flows to the front surface of the rear wall via the condensation removal holes to remove condensation on the surface.

Optionally, the step of acquiring a relative air humidity threshold $\varphi_0$ at which air in the second chamber begins to condense on the front surface of the rear wall includes:

acquiring a temperature $T_0$ of the front surface of the rear wall and an air temperature $T$ in the second chamber; and calculating the relative air humidity threshold $\varphi_0$ based on a correspondence relationship of a dew-point temperature, an ambient temperature and a relative humidity by taking the temperature $T_0$ of the front surface of the rear wall as the dew-point temperature and the air temperature $T$ as the ambient temperature.

Optionally, the control method further includes:

acquiring an open/closed state of the secondary door;

if the secondary door is open, stopping acquiring the relative air humidity $\varphi$ of the second chamber and the relative air humidity threshold $\varphi_0$; and if the secondary door is closed, persistently acquiring the relative air humidity $\varphi$ of the second chamber and the relative air humidity threshold $\varphi_0$.

Optionally, an inlet of the condensation removal air duct runs through a sidewall of the air supply port to communicate with the air supply port; a damper is mounted at the air supply port and is configured to controllably move into a cooling state in which the inlet is closed and the air supply port is opened, or move into a condensation removal state in which the inlet is opened and the air supply port is closed; and in the control method, if $\varphi \leq \varphi_0$, the damper is controlled to be in the cooling state to close the condensation removal air duct and open the air supply port; and if $\varphi > \varphi_0$, the damper is controlled to be in the condensation removal state to close the air supply port and open the condensation removal air duct.

Optionally, a fan is mounted at the air supply port and is configured to promote the air in the first chamber to flow to the air supply port; and the control method includes:
acquiring an open/closed state of the main door;
turning off the fan if the main door is open; and
turning on the fan if the main door is closed.

Optionally, a fan is mounted at the air supply port and is configured to promote the air in the first chamber to flow to the air supply port; and the control method includes:
acquiring an opening moment of the main door;
after the main door is opened, turning off the fan and starting to perform timing;
calculating a time duration in which the main door is open after the main door is closed again;
determining whether the time duration is longer than a first preset time;
if the time duration is longer than the first preset time, turning on the fan after the main door has been closed for a second preset time; and
if the time duration is not longer than the first preset time, turning on the fan when the main door is closed.

Optionally, the second preset time is greater than 1.5 times the first preset time.

Optionally, a fan is mounted at the air supply port and is configured to promote the air in the first chamber to flow to the air supply port; and the control method includes:
if $\varphi \leq \varphi_0$, making the fan run at a high air velocity; and
if $\varphi > \varphi_0$, making the fan run at a low air velocity.

Optionally, the rear wall is provided with an air return port in communication with the first chamber and the second chamber, and an outlet of the air duct runs through a sidewall of the air return port to communicate with the air return port.

In another aspect, the present invention further provides a computer storage medium, where the computer storage medium stores a computer program, and when the computer program runs, a device where the computer storage medium is located is caused to implement the control method for a refrigerator according to any one of the above descriptions.

According to the control method provided by the present invention, the refrigerator to which the control method is applied is a composite door type refrigerator, of which a door body includes a main door and a secondary door, where the main door is configured to open or close the first chamber defined by the refrigerator body, and the secondary door is configured to open or close the second chamber defined by the main door. The rear wall of the main door is hollow so as to define a defrosting air duct, and a plurality of condensation removal holes are formed backwards on the front surface of the rear wall. Whether the front surface of the rear wall of the main door (that is, a rear wall surface of the second chamber) satisfies a condition for starting condensation under current conditions is determined by comparing the relative air humidity $\varphi$ and the relative air humidity threshold $\varphi_0$, so as to select running a cooling mode or a condensation removal mode, thereby realizing prediction on condensation. Before condensation starts or at the beginning of condensation, condensation removal is started when there is only a small quantity of condensation, thereby achieving a quite high condensation removal velocity, and avoiding long-time accumulation of condensation.

Further, the control method provided by the present invention makes skillful use of the correspondence relationship of the dew-point temperature, the ambient temperature and the relative humidity, and the relative air humidity threshold $\varphi_0$ is evaluated based on the correspondence relationship of the dew-point temperature, the ambient temperature and the relative humidity by taking the temperature $T_0$ of the front surface of the rear wall as the dew-point temperature and the air temperature T as the ambient temperature, so as to determine whether there is a possibility that the air in the second chamber starts to condense on the front surface of the rear wall in a current temperature and humidity environment, and a calculation result is very accurate for prediction on condensation.

Further, in the control method provided by the present invention, there is consideration that when the secondary door is open, the second chamber exchanges a great amount of air with the external environment, causing large fluctuation of detected temperature and humidity values and inaccurate prediction result on condensation. Therefore, when the secondary door is open, acquisition of the relative air humidity $\varphi$ of the second chamber and the relative air humidity threshold $\varphi_0$ is stopped, that is, a process of predicting whether condensation will start on the front surface of the rear wall of the main door is stopped.

Further, in the control method provided by the present invention, there is consideration that in a period when the main door is open, the first chamber exchanging air with the external environment, or new objects being put into the first chamber may both cause increase of an absolute humidity of the air in the first chamber. Therefore, in the control method provided by the present invention, when the main door is open, the fan is turned off. In addition, if the main door has been opened for a time longer than a first preset time, the fan is turned on only after the main door has been closed for a second preset time, so as to prevent the air with a relatively high humidity in the first chamber from entering the second chamber to increase a risk of condensation in the second chamber.

Persons skilled in the art can more clearly understand the above and other purposes, advantages and features of the present invention according to the detailed description of specific embodiments of the present invention in conjunction with the accompanying drawings.

BRIEF DESCRIPTION OF THE DRAWINGS

Some specific embodiments of the present invention are described below in detail in an exemplary and unlimited way with reference to the accompanying drawings. The same or similar components or parts are indicated by the same reference numerals in the drawings. Persons skilled in the art should understand that these drawings are not necessarily drawn to scale. In the drawings.

DETAILED DESCRIPTION

A control method for a refrigerator, and a computer storage medium according to embodiments of the present invention are described below with reference to FIG. 1 to FIG. 10. The orientations or positional relationships indicated by the terms "front," "rear," "up," "down," "top," "bottom," "inside," "outside," "transverse" and the like are based on the orientations or positional relationships shown in the accompanying drawings. Such terms are intended merely for the ease and brevity of description of the present invention without indicating or implying that the apparatuses or components mentioned must have specified orientations or must be constructed and manipulated in the specified orientations, and therefore shall not be construed as any limitation on the present invention.

Figure 1:
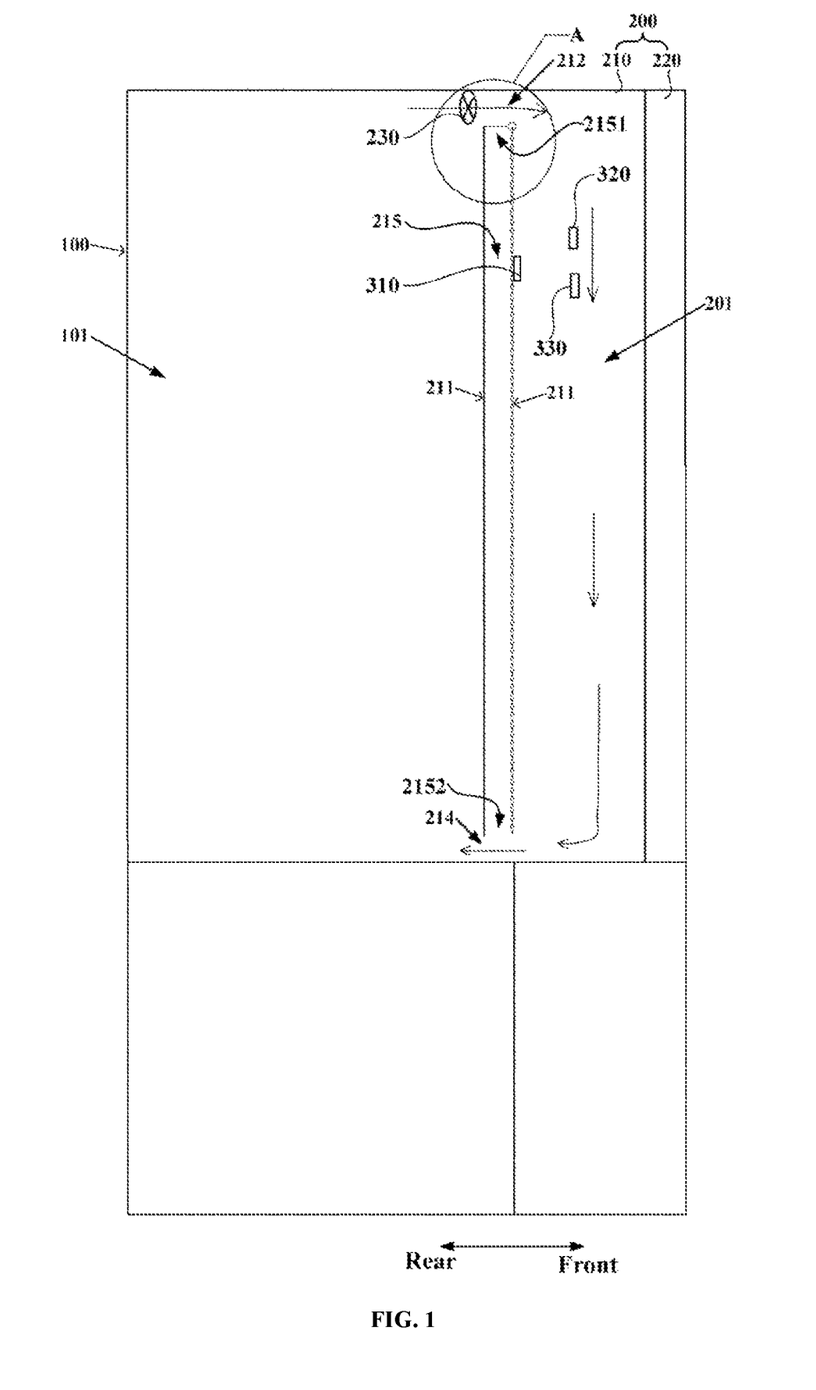
FIG. 1 is a schematic diagram of a refrigerator in a cooling mode according to an embodiment of the present invention.
Figure 2:
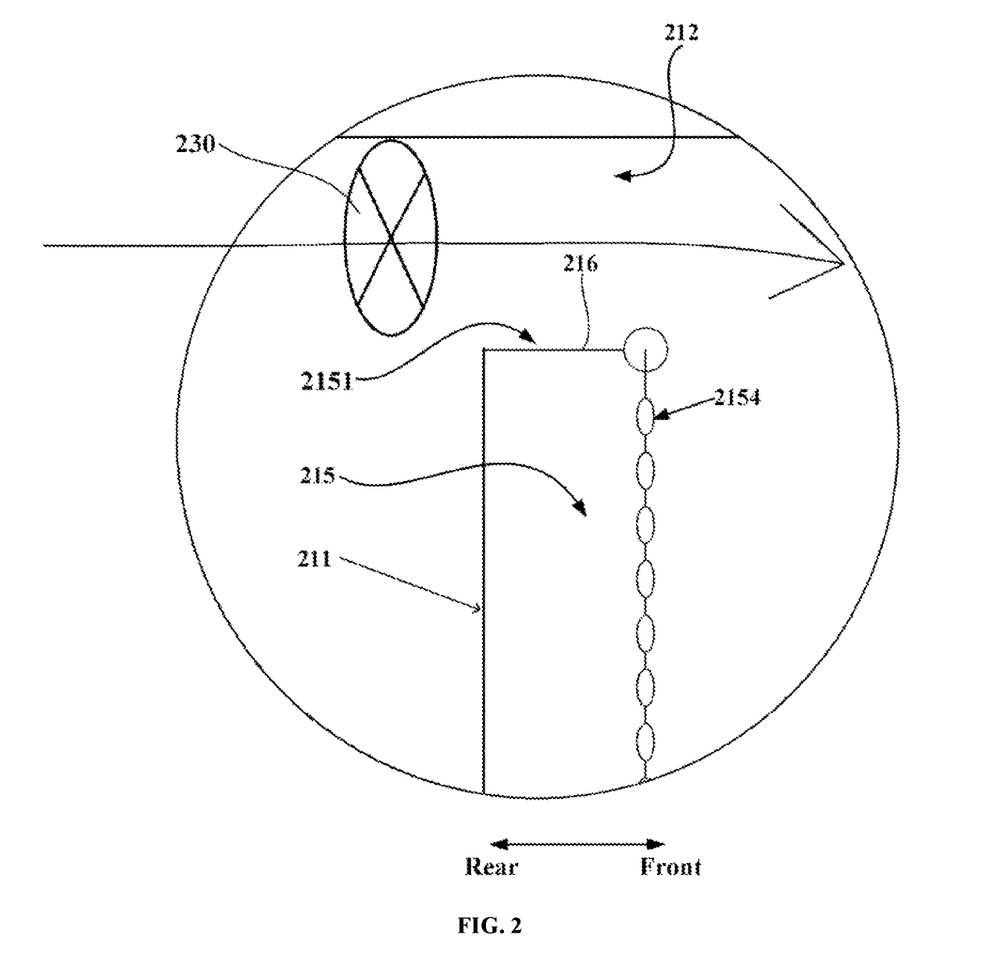
FIG. 2 is an enlarged view of a location A shown in FIG. 1.
Figure 3:
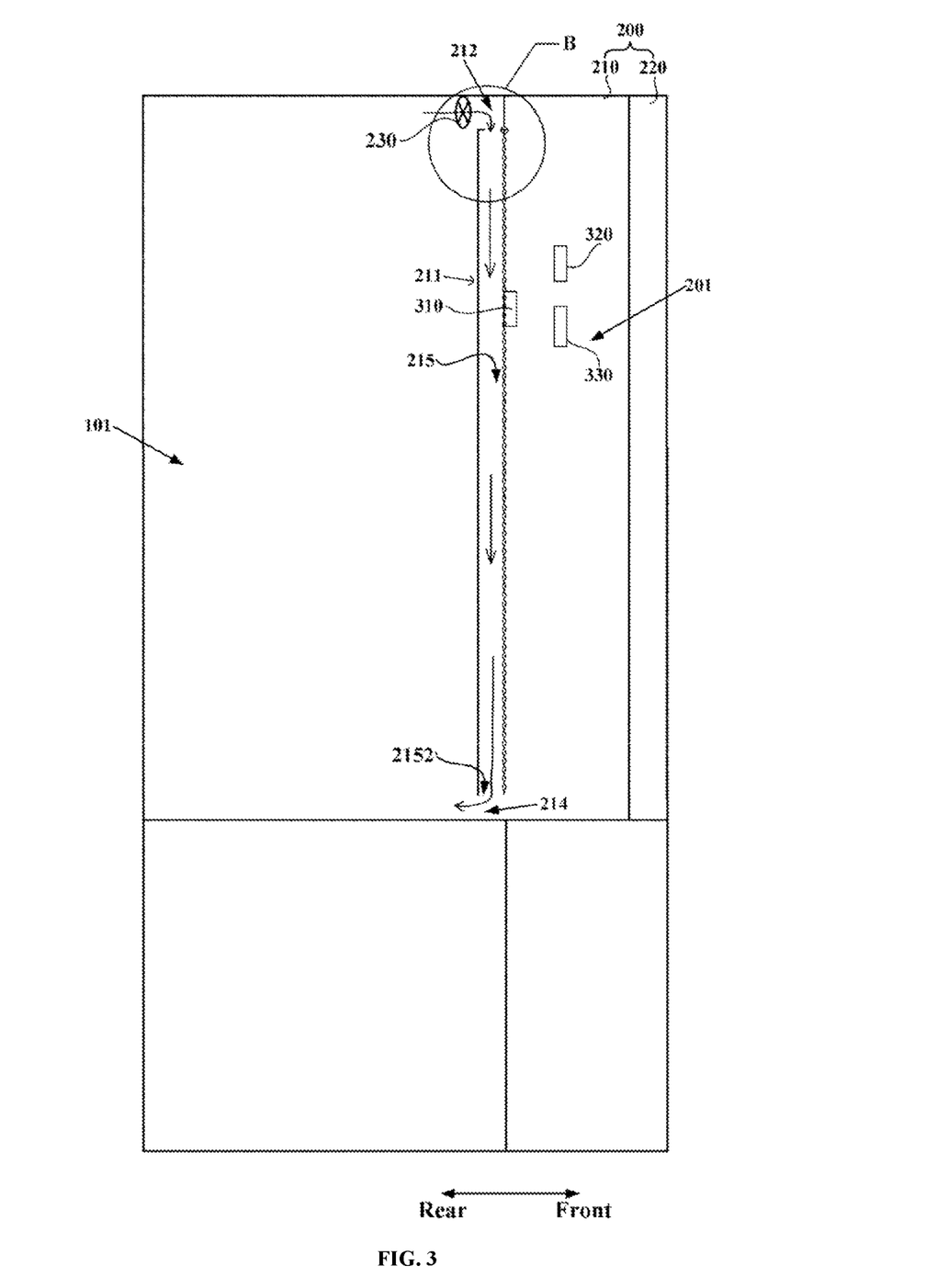
FIG. 3 is a schematic diagram of a state of the refrigerator shown in FIG. 1 in a condensation removal mode.
Figure 4:
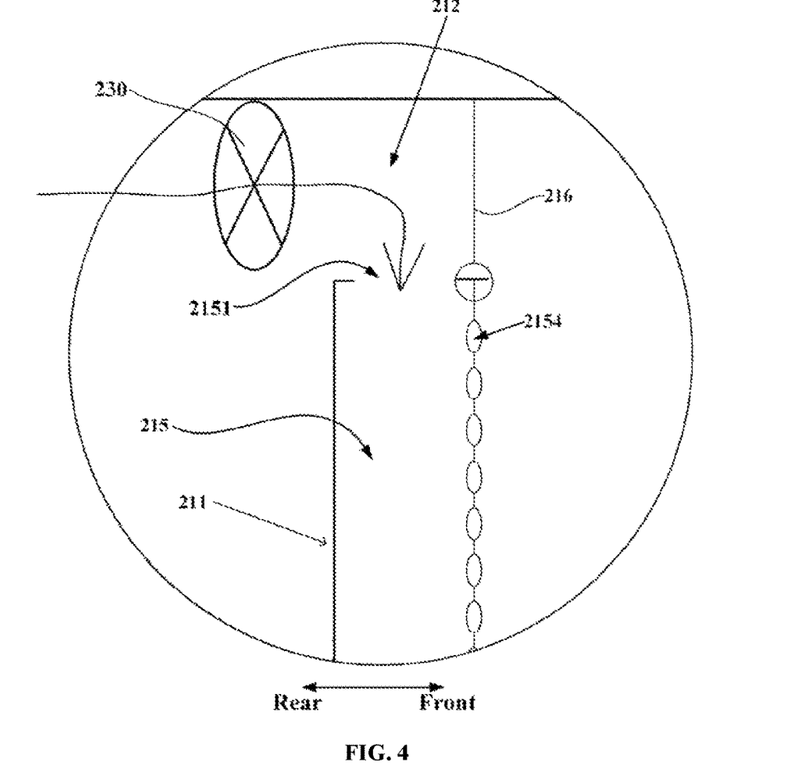
FIG. 4 is an enlarged view of a location B shown in FIG. 3.

FIG. 1 is a schematic diagram of a refrigerator in a cooling mode according to an embodiment of the present invention; FIG. 2 is an enlarged view of a location A shown in FIG. 1; FIG. 3 is a schematic diagram of a state of the refrigerator shown in FIG. 1 in a condensation removal mode; FIG. 4 is an enlarged view of a location B shown in FIG. 2; and an air direction is indicated by an arrow in each figure.

As shown in FIG. 1 to FIG. 4, the refrigerator according to the embodiments of the present invention may generally include a refrigerator body 100 and a door body 200. A front side of the refrigerator body 100 (in the present invention, the side where the door body 200 is located is considered as the front side of the refrigerator, and the forward direction and backward direction have been shown in the figures) is open to define a first chamber 101. The door body 200 includes a main door 210 and a secondary door 220, where the main door 210 is configured to open or close the first chamber 101 and defines a second chamber 201, and the secondary door 220 is configured to open or close the second chamber 201.

The refrigerator can perform refrigeration through a vapor compression refrigeration circulation system, a semiconductor refrigeration system, or other ways. According to differences of refrigeration temperatures, the chambers inside the refrigerator may be classified into a refrigeration chamber, a freezing chamber and a variable-temperature chamber. For example, a temperature in the refrigeration chamber is generally controlled between 2° C. and 10° C., preferably between 4° C. and 7° C. A temperature range in the freezing chamber is generally controlled between −22° C. and −14° C. A temperature in the variable-temperature chamber may be adjusted between −18° C. and 8° C. so as to realize a temperature variation effect. Different types of objects should be stored at different optimal storage temperatures, and also should be stored in different storage chambers. For example, fruit and vegetable foods are suitable for being stored in a refrigeration chamber, while meat foods are suitable for being stored in a freezing chamber. The first chamber 101 according to the embodiments of the present invention is preferably a refrigeration chamber.

The refrigerator according to the embodiments of the present invention is a composite door type refrigerator. In an existing composite door type refrigerator, the problem of condensation on the inner wall of the door chamber (which is the second chamber 201 in the present invention) often occurs. The inventors have realized that a rear wall 211 of the main door 210 is close to the first chamber 101, and can transfer heat with the air in the first chamber 101 through heat conduction; therefore, a temperature at a front surface of the rear wall 211 is lower than those at the other wall surfaces of the second chamber 201, and it is easier to produce condensation.

On the basis of the above concept, in this embodiment of the present invention, the main body 210 is specially designed, and condensation removal is specially performed for the front surface of the rear wall 211 of the second chamber 201. Specifically, the rear wall 211 of the main door 210 is provided with an air supply port 212, where the air supply port 212 is in communication with the first chamber 101 and the second chamber 201, and is configured to introduce cold air in the first chamber 101 into the second chamber 201. In addition, the rear wall 211 of the main door 210 may be further provided with an air return port 214 that is in communication with the first chamber 101 and the second chamber 201. The air supply port 212 and the air return port 214 are selectively located at a top and a bottom of the rear wall 211, respectively.

The rear wall 211 of the main door 210 is in a hollow shape, in which a condensation removal air duct 215 in communication with the first chamber 101 is defined. The front surface of the rear wall 211 is backwards provided with a plurality of condensation removal holes 2154 in communication with the second chamber 201 and the condensation removal air duct 215.

As shown in FIG. 1 and FIG. 3, an inlet 2151 of the condensation removal air duct 215 may run through a sidewall of the air supply port 212 so as to communicate with the air supply port 212. That is, the condensation removal air duct 215 achieves communication with the first chamber 101 via the air supply port 212, and there is no need to form an additional opening in the rear wall 211. Also, an outlet 2152 of the condensation removal air duct 215 may run through a sidewall of the air return port 214 so as to communicate with the air return port 214. That is, the condensation removal air duct 215 achieves communication with the first chamber 101 via the air return port 214, and there is no need to form an additional opening in the rear wall 211. The structure designed in this way is quite ingenious, and a perforated structure of the rear wall 211 of the main door 210 is simplified, so that only the air supply port 212 and the air return port 214 need to be directly formed in the rear surface of the rear wall 211 of the main body 210.

As shown in FIG. 2 and FIG. 4, the refrigerator may further include a damper 216, where the damper 216 is mounted at the air supply port 212, and is configured to controllably move into a cooling state (as shown in FIG. 2) in which the inlet 2151 is closed and the air supply port 212 is opened, or move into a condensation removal state (as shown in FIG. 4) in which the inlet 2151 is opened and the air supply port 212 is closed. This embodiment makes effective use of the advantage of communication between the inlet 2151 and the air supply port 212, and the air supply port 212 and the inlet 2151 are controlled by one damper 216 at the same time, simplifying air input and output control and achieving an ingenious design.

Specifically, as shown in FIG. 2 and FIG. 4, one end of the damper 216 is rotatably mounted at a front edge of the inlet 2151, so that the damper 216 can rotate into the cooling state (as shown in FIG. 2) or the condensation removal state (as shown in FIG. 4). In this embodiment of the present invention, complex movement mechanism and control logic are not needed, and an operating mode of the refrigerator can be switched by controlling rotation of one damper 216, greatly simplifying the structure and control.

In some embodiments, as shown in FIG. 1 to FIG. 4, the refrigerator further includes a fan 230, where the fan 230 is located at the air supply port 212 to promote the air in the first chamber 101 to flow to the air supply port 212, thus promoting flowing of air flow.

Figure 5:
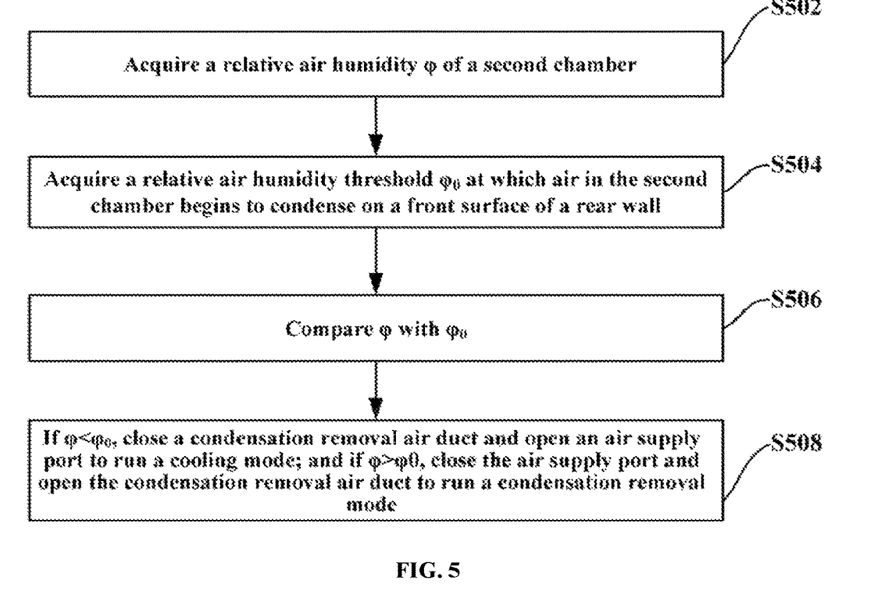
FIG. 5 is a schematic diagram of a control method for a refrigerator of the present invention.

FIG. 5 is a schematic diagram of a control method for a refrigerator of the present invention. The control method for a refrigerator according to this embodiment of the present invention is applicable to the refrigerators according to all the foregoing embodiments. As shown in FIG. 5, the control method for a refrigerator includes:

Step S502: acquiring a relative air humidity $\varphi$ of the second chamber 201. As shown in FIG. 1, a humidity sensor 330 is disposed in the second chamber 201 to detect the relative air humidity $\varphi$.

Step S504: acquiring a relative air humidity threshold $\varphi_0$ at which the air in the second chamber 201 begins to condense on the front surface of the rear wall 211.

Step S506: comparing the relative air humidity $\varphi$ with the relative air humidity threshold $\varphi_0$.

Step S508: If $\varphi \leq \varphi_0$, closing the condensation removal air duct 215 and opening the air supply port 212 to run a cooling mode in which the air in the first chamber 101 enters the second chamber 201 via the air supply port 212; and if $\varphi > \varphi_0$, closing the air supply port 212 and opening the condensation removal air duct 215 to run a condensation removal mode in which the air in the first chamber 101 enters the condensation removal air duct 215 and flows to the front surface of the rear wall 211 via the condensation removal holes 2154 to remove condensation on the surface.

In the foregoing steps, the refrigerator determines whether the front surface of the rear wall 211 of the main door 210 (that is, a rear wall surface of the second chamber 201) satisfies a condition for starting condensation by comparing the relative air humidity Y and the relative air humidity threshold $\varphi_0$, so as to select running a cooling mode or a condensation removal mode, thereby realizing prediction on condensation. If $\varphi \leq \varphi_0$, it is determined that the relative air humidity in the second chamber 201 is not large enough to enable the front surface of the rear wall 211 of the main door 210 to meet a condensation condition, condensation will not occur, and therefore the cooling mode is operated to normally provide cold energy for the second chamber 201. On the contrary, if $\varphi > \varphi_0$, it is determined that the relative air humidity in the second chamber 201 is large enough and reaches a condensation threshold, the front surface of the rear wall 211 of the main door 210 meets a condensation condition, and accordingly condensation is to start or condensation has been produced. Therefore, there is a need to run the condensation removal mode. Since $\varphi > \varphi_0$, it is determined that the relative air humidity in the second chamber 201 is large enough, and the air in the condensation removal air duct 215 must have a lower relative humidity than the original air flow at the front surface of the rear wall 211 of the main door 210. Therefore, introduction of low-humidity air from the condensation removal air duct 215 can promote evaporation of condensation, such that a condensation removal process can be completed.

In this embodiment of the present invention, before condensation starts or at the beginning of condensation, condensation removal is started when there is only a small quantity of condensation, which achieves a quite high condensation removal velocity and can effectively avoid production of a large quantity of condensation. In addition, when the refrigerator runs in the condensation removal mode, a traditional way of electrically heating the rear wall 211 or introducing hot air is not adopted. Instead, cold air in the first chamber 101 is used to remove condensation, and the condensation removal process has no influences on normal refrigeration of the second chamber 201, realizing a quite ingenious structural design.

In some embodiments, the forgoing steps may be further optimized and configured to make the refrigerator achieve better technical effects. The following describes in detail the control method for a refrigerator according to this embodiment in conjunction with introduction of an optional execution procedure of this embodiment. This embodiment is merely an example of the execution procedure. In specific implementation, the execution sequence and operation conditions of some steps may be modified according to specific implementation requirements.

Figure 6:
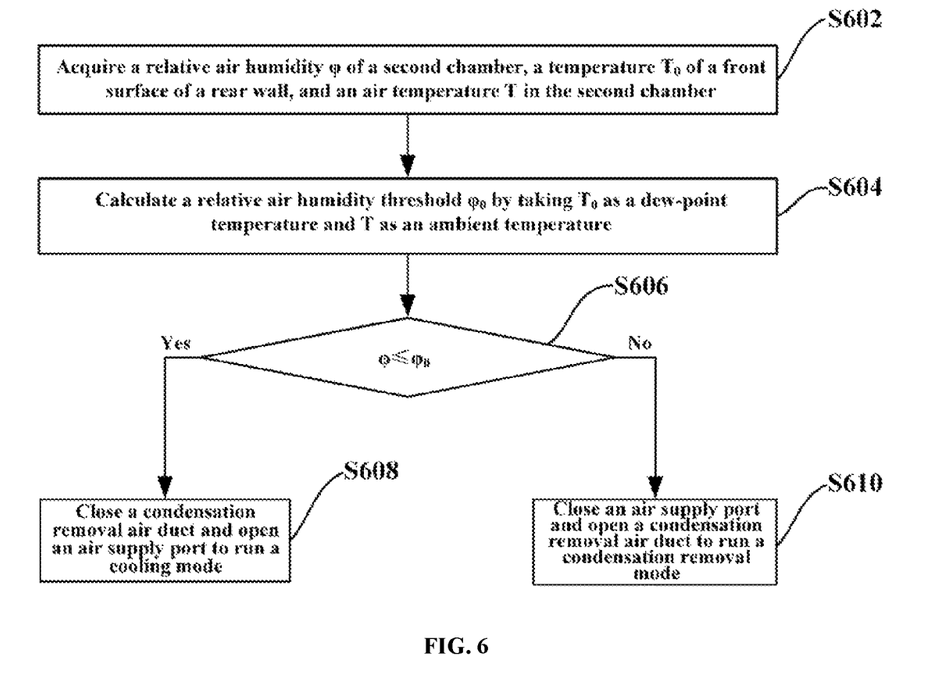
FIG. 6 is a flowchart of a control method for a refrigerator according to an embodiment of the present invention.

FIG. 6 is a flowchart of a control method for a refrigerator according to an embodiment of the present invention. As shown in FIG. 6, the control method for a refrigerator according to this embodiment includes the following steps:

Step S602: acquiring a relative air humidity $\varphi$ of the second chamber 201, a temperature $T_0$ of the front surface of the rear wall of the main door 210, and an air temperature T in the second chamber 201. As shown in FIG. 3, a temperature sensor 310 is used to detect the temperature $T_0$ of the front surface of the rear wall 211, and a temperature sensor 320 is used to detect the air temperature T in the second chamber 201.

Step S604: calculating the relative air humidity threshold $\varphi_0$ based on a correspondence relationship of a dew-point temperature, an ambient temperature and a relative humidity by taking the temperature $T_0$ of the front surface of the rear wall as the dew-point temperature and the air temperature T as the ambient temperature. Specifically, the "correspondence relationship of a dew-point temperature, an ambient temperature and a relative humidity" is known by persons skilled in the art, belongs to basic knowledge commonly used in the field of refrigeration, and specifically includes a computational formula and a relationship table, which do not need to be described in detail herein.

Step S606: comparing the relative air humidity $\varphi$ with the relative air humidity threshold $\varphi_0$ to determine whether $\varphi \leq \varphi_0$ is valid. If $\varphi \leq \varphi_0$ is valid, step S608 is implemented; otherwise, step S610 is implemented.

Step S608: closing the condensation removal air duct 215 and opening the air supply port 212 to run a cooling mode in which the air in the first chamber 101 enters the second chamber 201 via the air supply port 212.

Step S610: closing the air supply port 212 and opening the condensation removal air duct 215 to run a condensation removal mode in which the air in the first chamber 101 enters the condensation removal air duct 215 and flows to the front surface of the rear wall 211 via the condensation removal holes 2154 to remove condensation on the surface.

This embodiment of the present invention makes skillful use of the correspondence relationship of the dew-point temperature, the ambient temperature and the relative humidity, and the relative air humidity threshold $\varphi_0$ is evaluated based on the correspondence relationship of the dew-point temperature, the ambient temperature and the relative humidity by taking the temperature $T_0$ of the front surface of the rear wall as the dew-point temperature and the air temperature T as the ambient temperature, so as to determine whether there is a possibility that the air in the second chamber 201 starts to condense on the front surface of the rear wall in a current temperature and humidity environment, and a calculation result is very accurate for prediction on condensation.

Figure 7:
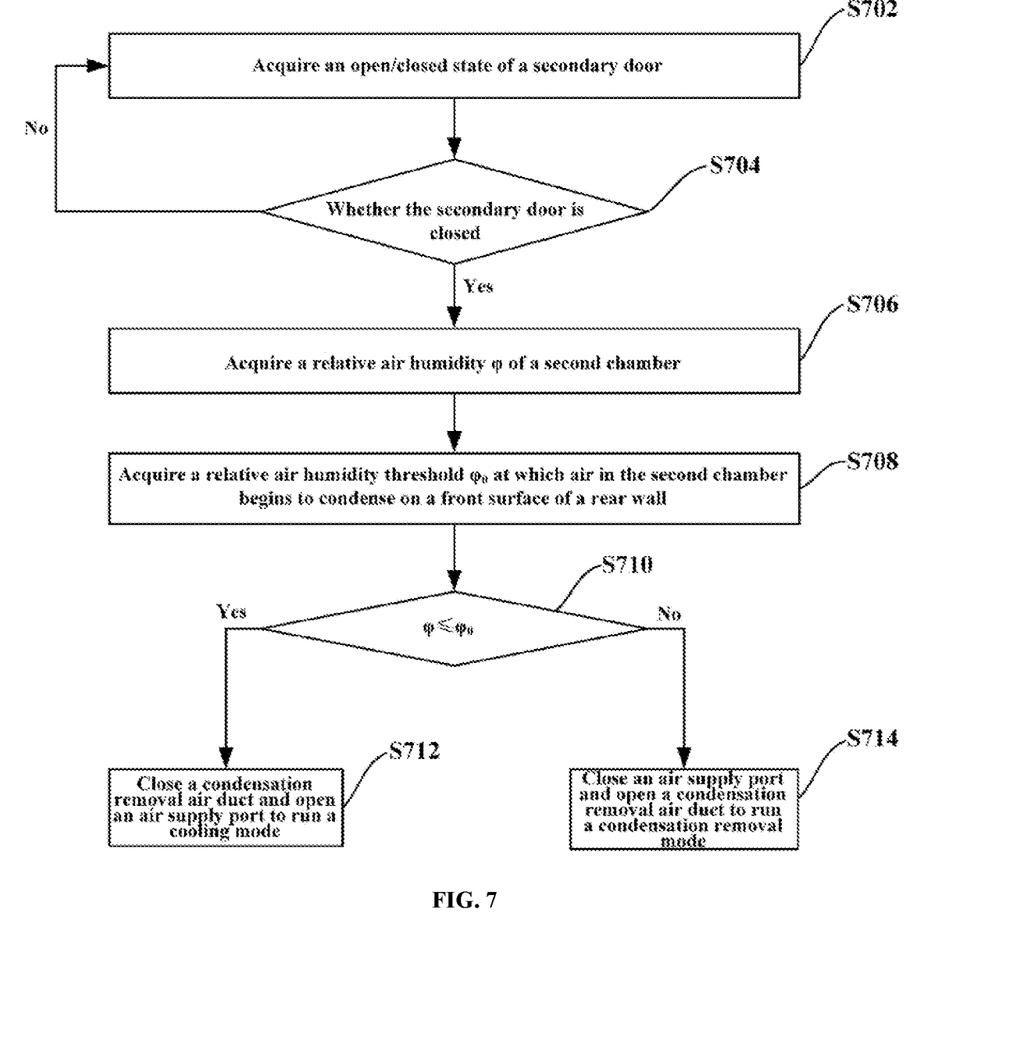
FIG. 7 is a flowchart of a control method for a refrigerator according to another embodiment of the present invention.

FIG. 7 is a flowchart of a control method for a refrigerator according to another embodiment of the present invention. As shown in FIG. 7, the control method for a refrigerator according to this embodiment includes the following steps:

Step S702: acquiring an open/closed state of the secondary door 220.

Step S704: determining whether the secondary door 220 is closed. If the secondary door 220 is closed, step S706 is implemented; otherwise, acquiring the relative air humidity φ of the second chamber and the relative air humidity threshold $\varphi_0$ is stopped, and step S702 is implemented again.

Step S706: acquiring a relative air humidity φ of the second chamber 201. As shown in FIG. 1, a humidity sensor 330 is disposed in the second chamber 201 to detect the relative air humidity φ.

Step S708: acquiring a relative air humidity threshold $\varphi_0$ at which the air in the second chamber 201 begins to condense on the front surface of the rear wall 211.

Step S710: comparing the relative air humidity φ with the relative air humidity threshold $\varphi_0$ to determine whether $\varphi \leq \varphi_0$ is valid. If $\varphi \leq \varphi_0$ is valid, step S712 is implemented; otherwise, step S714 is implemented.

Step S712: closing the condensation removal air duct 215 and opening the air supply port 212 to run a cooling mode in which the air in the first chamber 101 enters the second chamber 201 via the air supply port 212.

Step S714: closing the air supply port 212 and opening the condensation removal air duct 215 to run a condensation removal mode in which the air in the first chamber 101 enters the condensation removal air duct 215 and flows to the front surface of the rear wall 211 via the condensation removal holes 2154 to remove condensation on the surface.

In the control method according to this embodiment of the present invention, when the secondary door 220 is open, acquisition of the relative air humidity φ of the second chamber 201 and the relative air humidity threshold $\varphi_0$ is stopped, that is, a process of predicting whether condensation will start on the front surface of the rear wall 211 of the main door is stopped. In this way, a situation that the second chamber 201 exchanges a great amount of air with the external environment to cause large fluctuation of detected temperature and humidity values and inaccurate prediction result on condensation when the secondary door 220 is open is avoided.

Figure 8:
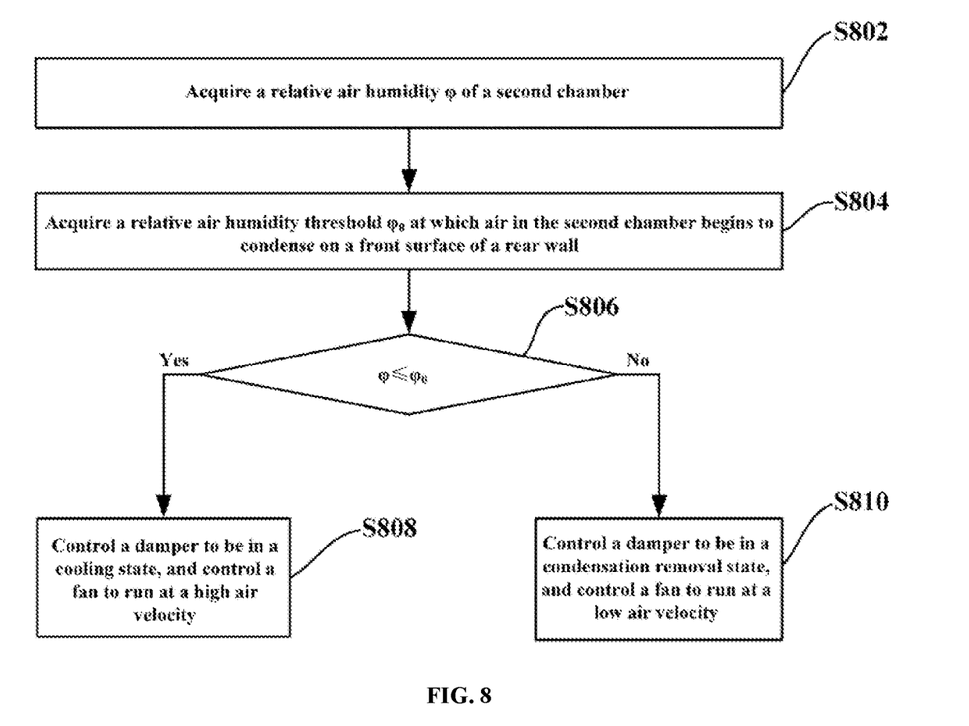
FIG. 8 is a flowchart of a control method for a refrigerator according to a further embodiment of the present invention.

FIG. 8 is a flowchart of a control method for a refrigerator according to a further embodiment of the present invention. As described above, the refrigerator may further include a damper 216 and a fan 230, where the damper 216 is mounted at the air supply port 212, and is configured to controllably move into a cooling state (as shown in FIG. 2) in which the inlet 2151 is closed and the air supply port 212 is opened, or move into a condensation removal state (as shown in FIG. 4) in which the inlet 2151 is opened and the air supply port 212 is closed. The fan 230 is located at the air supply port 212 to promote the air in the first chamber 101 to flow to the air supply port 212, thus promoting flowing of air flow.

Therefore, in some embodiments, if $\varphi \leq \varphi_0$, the damper 216 is controlled to be in the cooling state so as to close the condensation removal air duct 215 and open the air supply port 212; and if $\varphi > \varphi_0$, the damper 216 is controlled to be in the condensation removal state so as to close the air supply port 212 and open the condensation removal air duct 215. If $\varphi \leq \varphi_0$, the fan 230 is enabled to run at a high air velocity so as to accelerate refrigeration in the second chamber 201; and if $\varphi > \varphi_0$, the fan 230 is enabled to run at a low air velocity. As shown in FIG. 8, the control method for a refrigerator according to an embodiment of the present invention includes the following steps:

Step S802: acquiring a relative air humidity φ of the second chamber 201. As shown in FIG. 1, the humidity sensor 330 is disposed in the second chamber 201 to detect the relative air humidity φ.

Step S804: acquiring a relative air humidity threshold $\varphi_0$ at which the air in the second chamber 201 begins to condense on the front surface of the rear wall 211.

Step S806: comparing the relative air humidity φ with the relative air humidity threshold Po to determine whether $\varphi \leq \varphi_0$ is valid. If $\varphi \leq \varphi_0$ is valid, step S808 is implemented; otherwise, step S810 is implemented.

Step S808: controlling the damper 216 to be in the cooling state, and enabling the fan 230 to run at a high air velocity.

Step S810: controlling the damper 216 to be in the condensation removal state, and enabling the fan 230 to run at a low air velocity.

Figure 9:
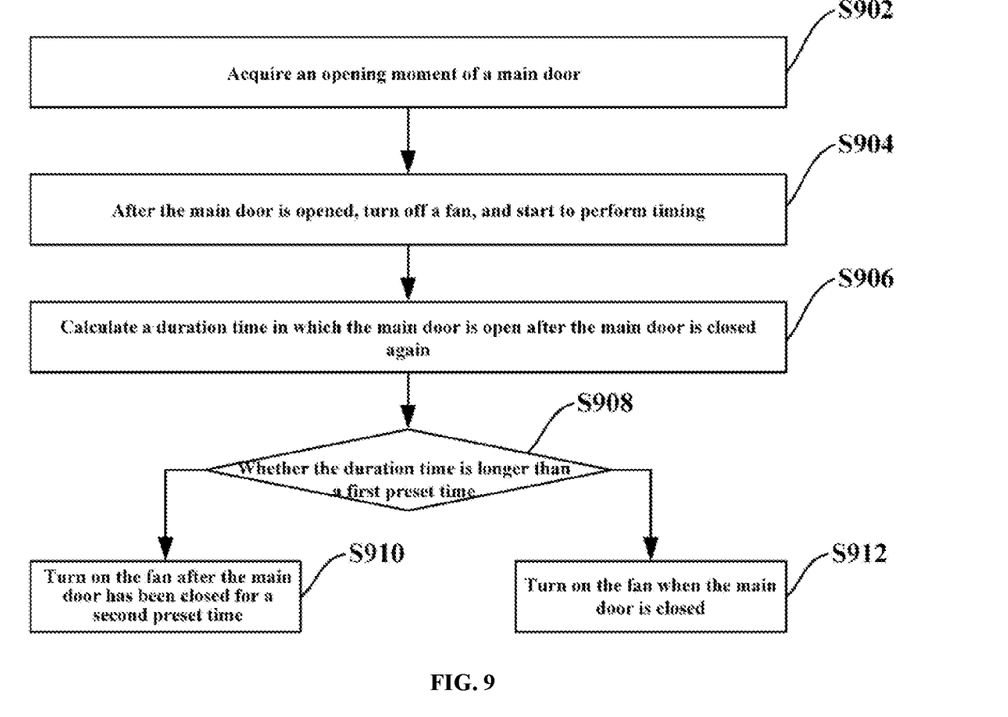
FIG. 9 is a flowchart of a control method for a refrigerator according to a yet further embodiment of the present invention.

FIG. 9 is a flowchart of a control method for a refrigerator according to a yet further embodiment of the present invention. As shown in FIG. 9, the control method according to this embodiment of the present invention includes the following steps:

Step S902: acquiring an opening moment of the main door 210.

Step S904: after the main door 210 is opened, turning off the fan 230 and starting to perform timing.

Step S906: calculating a time duration in which the main door 210 is open after the main door 210 is closed again.

Step S908: determining whether the time duration is longer than a first preset time. If yes, step S910 is implemented; otherwise, step S912 is implemented.

Step S910: turning on the fan 230 after the main door 210 has been closed for a second preset time.

Step S912: turning on the fan 230 when the main door 210 is closed.

In the control method according to the foregoing embodiment of the present invention, there is consideration that in a period when the main door 210 is open, the first chamber 101 exchanging air with the external environment, or new objects being put into the first chamber may both cause increase of an absolute humidity of the air in the first chamber 101. Therefore, in this embodiment, when the main door 210 is open, the fan 230 is turned off. In addition, if the main door 210 has been opened for a time longer than a first preset time, the fan 230 is turned on only after the main door 210 has been closed for a second preset time, so as to prevent the air with a relatively high humidity in the first chamber 101 from entering the second chamber 201 to increase a risk of condensation in the second chamber 201. Preferably, the second preset time is greater than 1.5 times the first preset time.

In some alternative embodiments, the control method may adopt the following steps with simpler logic:
acquiring an open/closed state of the main door 210;
turning off the fan 230 if the main door 210 is open; and
turning on the fan 230 if the main door 210 is closed.

Figure 10:
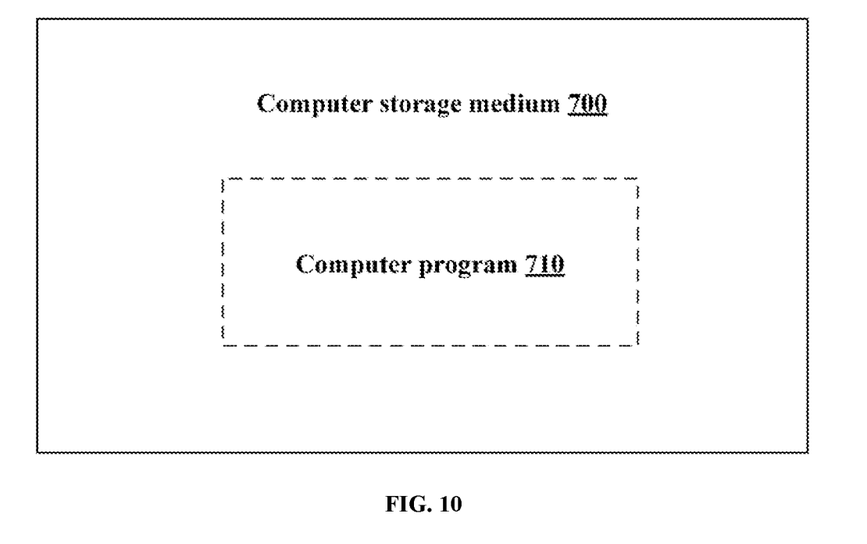
FIG. 10 is a schematic diagram of a computer storage medium of the present invention.

The present invention further provides a computer storage medium. FIG. 10 is a schematic diagram of a computer storage medium of the present invention.

As shown in FIG. 10, the computer storage medium 700 stores a computer program 710, and when the computer program 710 runs, a device where the computer storage medium 700 is located is caused to implement the control method for a refrigerator according to any one of the foregoing embodiments. The device where the computer storage medium 700 is located is a refrigerator, by which the control method for a refrigerator according to any one of the foregoing embodiments can be implemented.

The computer storage medium 700 according to this embodiment may be an electronic memory such as a flash memory, an EEPROM (Electrically Erasable Programmable Read Only Memory), an EPROM, a hard disk, or a ROM. The computer storage medium 700 includes a storage space for the computer program 710 that executes any method and step of the forgoing methods. This computer program 710 may be read from or wrote into one or more computer program products. These computer program products include program code carriers such as a hard disc, a compact disc (CD), a memory card, or a floppy disc. When the device where the computer storage medium 700 is located executes the computer program 710, all steps in the method described above can be implemented.

In conclusion, it should be learned by those skilled in the art that although various exemplary embodiments of the present invention have been illustrated and described in detail herein, many other variations or modifications consistent with the principles of the present invention may be directly determined or derived from the disclosure of the present invention without departing from the spirit and scope of the present invention. Therefore, the scope of the present invention should be construed and considered as covering all these other variations or modifications.

What is claimed is:

1. A control method for a refrigerator, wherein the refrigerator comprises a refrigerator body and a door body; a front side of the refrigerator body is open to define a first chamber; the door body comprises a main door configured to open or close the first chamber and defining a second chamber, and a secondary door configured to open or close the second chamber; a rear wall of the main door is provided with an air supply port configured to supply cold air in the first chamber into the second chamber; the rear wall is in a hollow shape, in which a condensation removal air duct in communication with the first chamber is defined; a plurality of condensation removal holes in communication with the second chamber and the condensation removal air duct are formed backwards on a front surface of the rear wall; and the control method comprises:
   acquiring a relative air humidity q of the second chamber;
   acquiring a relative air humidity threshold Po at which air in the second chamber begins to condense on the front surface of the rear wall;
   comparing the relative air humidity $\varphi$ with the relative air humidity threshold $\varphi_0$;
   if $\varphi \leq \varphi_0$, closing the condensation removal air duct, and opening the air supply port to run a cooling mode in which the air in the first chamber enters the second chamber via the air supply port; and
   if $\varphi > \varphi_0$, closing the air supply port, and opening the condensation removal air duct to run a condensation removal mode in which the air in the first chamber enters the condensation removal air duct and flows to the front surface of the rear wall via the condensation removal holes to remove condensation on the surface.

2. The control method according to claim 1, wherein the step of acquiring a relative air humidity threshold $\varphi_0$ at which air in the second chamber begins to condense on the front surface of the rear wall comprises:
   acquiring a temperature $T_0$ of the front surface of the rear wall and an air temperature T in the second chamber; and
   calculating the relative air humidity threshold $\varphi_0$ based on a correspondence relationship of a dew-point temperature, an ambient temperature and a relative humidity by taking the temperature $T_0$ of the front surface of the rear wall as the dew-point temperature and the air temperature T as the ambient temperature.

3. The control method according to claim 1, further comprising:
   acquiring an open/closed state of the secondary door;
   if the secondary door is open, stopping acquiring the relative air humidity $\varphi$ of the second chamber and the relative air humidity threshold $\varphi_0$; and
   if the secondary door is closed, persistently acquiring the relative air humidity $\varphi$ of the second chamber and the relative air humidity threshold $\varphi_0$.

4. The control method according to claim 1, wherein
   an inlet of the condensation removal air duct runs through a sidewall of the air supply port to communicate with the air supply port; a damper is mounted at the air supply port and is configured to controllably move into a cooling state in which the inlet is closed and the air supply port is opened, or move into a condensation removal state in which the inlet is opened and the air supply port is closed; and in the control method,
   if $\varphi \leq \varphi_0$, the damper is controlled to be in the cooling state to close the condensation removal air duct and open the air supply port; and
   if $\varphi > \varphi_0$, the damper is controlled to be in the condensation removal state to close the air supply port and open the condensation removal air duct.

5. The control method according to claim 4, wherein
   a fan is mounted at the air supply port and is configured to promote the air in the first chamber to flow to the air supply port; and the control method comprises:
   acquiring an open/closed state of the main door;
   turning off the fan if the main door is open; and
   turning on the fan if the main door is closed.

6. The control method according to claim 4, wherein
   a fan is mounted at the air supply port and is configured to promote the air in the first chamber to flow to the air supply port; and the control method comprises:
   acquiring an opening moment of the main door;
   after the main door is opened, turning off the fan and starting to perform timing;
   calculating a time duration in which the main door is open after the main door is closed again;
   determining whether the time duration is longer than a first preset time;
   if the time duration is longer than the first preset time, turning on the fan after the main door has been closed for a second preset time; and
   if the time duration is not longer than the first preset time, turning on the fan when the main door is closed.

7. The control method according to claim 6, wherein the second preset time is greater than 1.5 times the first preset time.

8. The control method according to claim 4, wherein
   a fan is mounted at the air supply port and is configured to promote the air in the first chamber to flow to the air supply port; and the control method comprises:
   if $\varphi \leq \varphi_0$, making the fan run at a high air velocity; and
   if $\varphi > \varphi_0$, making the fan run at a low air velocity.

9. The control method according to claim 4, wherein
the rear wall is provided with an air return port in communication with the first chamber and the second chamber, and an outlet of the air duct runs through a sidewall of the air return port to communicate with the air return port.

10. A computer storage medium, wherein the computer storage medium stores a computer program, and when the computer program runs, a device where the computer storage medium is located is caused to implement the control method for a refrigerator according to claim 1.

* * * * *